United States Patent
Honda et al.

(10) Patent No.: US 12,434,309 B2
(45) Date of Patent: Oct. 7, 2025

(54) MILLING CUTTER AND BLADE PART THEREOF

(71) Applicant: KANEFUSA KABUSHIKI KAISHA, Niwa-gun (JP)

(72) Inventors: Naoya Honda, Niwa-gun (JP); Hirooki Narita, Niwa-gun (JP)

(73) Assignee: KANEFUSA KABUSHIKI KAISHA, Niwa-gun (JP)

( * ) Notice: Subject to any disclaimer, the term of this patent is extended or adjusted under 35 U.S.C. 154(b) by 656 days.

(21) Appl. No.: 17/764,095

(22) PCT Filed: Sep. 23, 2020

(86) PCT No.: PCT/JP2020/035781
§ 371 (c)(1),
(2) Date: Mar. 25, 2022

(87) PCT Pub. No.: WO2021/060271
PCT Pub. Date: Apr. 1, 2021

(65) Prior Publication Data
US 2022/0371109 A1    Nov. 24, 2022

(30) Foreign Application Priority Data
Sep. 27, 2019   (JP) ................. 2019-177998

(51) Int. Cl.
*B23C 5/22*  (2006.01)
*B23Q 11/10* (2006.01)
*B23C 5/28*  (2006.01)

(52) U.S. Cl.
CPC .............. *B23C 5/2204* (2013.01); *B23C 5/28* (2013.01); *B23C 2210/02* (2013.01); *B23C 2210/244* (2013.01)

(58) Field of Classification Search
CPC ........... B23C 5/2204; B23C 5/18; B23C 5/28; B23C 2210/02; B23C 2210/244;
(Continued)

(56) References Cited

U.S. PATENT DOCUMENTS 1,461,548 A * 7/1923 West ................. B23B 51/02
                                                   408/144
2,289,683 A * 7/1942 Rzeppa ............. B24B 41/06
                                                   451/365
(Continued)

FOREIGN PATENT DOCUMENTS

| CN | 102350528 A | 2/2012 |
| CN | 106392162 A | 2/2017 |

(Continued)

OTHER PUBLICATIONS

Combined Chinese Office Action and Search Report issued Apr. 12, 2023, in corresponding Chinese Patent Application No. 202080065205.1 (with English Translation), 22 pages.

(Continued)

*Primary Examiner* — Sara Addisu
(74) *Attorney, Agent, or Firm* — Oblon, McClelland, Maier &Neustadt, L.L.P.

(57) ABSTRACT

This milling cutter includes: a blade part 10 having a plurality of tips 12 each having an end cutting edge 121 and a peripheral cutting edge 122, and a blade-body portion 11 which is a plate-shaped body with the plurality of tips 12 fixed to an outer circumference thereof and has a groove 113 in accordance with a position of each tip; and a body 20 being rotatable around a rotational axis and having a front-end portion 21 having a front-end surface to which a rear-end surface of the blade-body portion 11 is fixable detachably and in close contact therewith, and a front-end outer-circumferential portion whose outer diameter is 100/100 to 97/100 using an outer diameter of the blade part 10

(Continued)

as a reference, the front-end outer-circumferential portion having a body-side groove 211 continuous to the groove 113 of the blade-body portion 11 contacted closely.

16 Claims, 5 Drawing Sheets

(58) Field of Classification Search
CPC . B23C 5/06; B23C 2210/03; B23C 2226/125; B23C 2226/18; B23C 2226/315; B23C 2270/14; B23C 5/00
See application file for complete search history.

(56) References Cited

U.S. PATENT DOCUMENTS

| | | | | |
|---|---|---|---|---|
| 2,431,581 A * | 11/1947 | Owen | ................. | B23C 5/006 407/56 |
| 2,476,749 A * | 7/1949 | Marsh | ................. | B23C 5/18 83/855 |
| 2,524,232 A * | 10/1950 | Onsrud | ................. | B23Q 11/10 407/34 |
| 2,805,469 A | 9/1957 | Greenleaf | | |
| 3,986,543 A * | 10/1976 | Slayton | ................. | B27G 13/12 144/237 |
| 4,563,929 A * | 1/1986 | Ringlee | ................. | B23D 61/021 144/34.1 |
| 4,954,021 A | 9/1990 | Tsujimura et al. | | |
| 4,995,767 A | 2/1991 | Segal | | |
| 5,201,353 A * | 4/1993 | Weill | ................. | B23C 5/2243 172/549 |
| 5,290,135 A * | 3/1994 | Ball | ................. | B23Q 11/10 407/11 |
| 5,542,792 A * | 8/1996 | Krueger | ................. | B23B 31/1075 407/41 |
| 5,551,811 A * | 9/1996 | Satran | ................. | B23B 31/008 407/40 |
| 5,863,156 A | 1/1999 | Satran et al. | | |
| 5,947,650 A | 9/1999 | Satran et al. | | |
| 6,053,672 A | 4/2000 | Satran et al. | | |
| 6,343,902 B1 * | 2/2002 | Nishikawa | ................. | B23C 5/10 407/31 |
| 6,488,456 B1 * | 12/2002 | Satran | ................. | B23P 11/025 83/838 |
| 7,363,692 B2 * | 4/2008 | Kress | ................. | B23B 51/009 408/1 R |
| 7,625,161 B1 * | 12/2009 | Ruy Frota de Souza | ................. | B23B 51/06 407/34 |
| 7,775,751 B2 * | 8/2010 | Hecht | ................. | B23D 77/006 408/233 |
| 8,784,019 B2 * | 7/2014 | Pabel | ................. | B23B 51/02 408/231 |
| 10,799,958 B2 * | 10/2020 | Wacinski | ................. | B23B 51/02 |
| 2004/0042858 A1 * | 3/2004 | Sheffler | ................. | B24D 7/18 409/32 |
| 2008/0175676 A1 * | 7/2008 | Prichard | ................. | B23Q 11/10 407/11 |
| 2015/0003922 A1 * | 1/2015 | Orlov | ................. | B23C 5/10 407/53 |
| 2015/0266101 A1 * | 9/2015 | Rimet | ................. | B23D 77/006 407/56 |
| 2015/0290726 A1 * | 10/2015 | Lehto | ................. | B23C 5/006 407/11 |
| 2016/0107284 A1 * | 4/2016 | Haimer | ................. | B23B 31/10 279/20 |
| 2021/0053127 A1 * | 2/2021 | Morgulis | ................. | B23C 5/26 |
| 2022/0203463 A1 * | 6/2022 | Nagata | ................. | B23C 5/1063 |
| 2022/0250173 A1 * | 8/2022 | Inagaki | ................. | B23C 5/10 |
| 2023/0226625 A1 * | 7/2023 | Volk | ................. | B23C 5/006 409/135 |
| 2023/0398613 A1 * | 12/2023 | Gey | ................. | B23D 61/025 |
| 2024/0066614 A1 * | 2/2024 | Zumsteg | ................. | B23C 5/08 |
| 2024/0246159 A1 * | 7/2024 | Bergman | ................. | B23C 5/28 |

FOREIGN PATENT DOCUMENTS

| | | | | |
|---|---|---|---|---|
| DE | 102021122655 A1 * | 3/2023 | ............. | B23C 5/28 |
| EP | 2540425 A1 * | 1/2013 | ............. | B23C 5/28 |
| GB | 2488431 A * | 8/2012 | ............. | B23B 31/11 |
| JP | 1-310806 A | 12/1989 | | |
| JP | 6-23650 A | 2/1994 | | |
| JP | 9-24504 A | 1/1997 | | |
| JP | 3041243 U | 9/1997 | | |
| JP | 11-513315 A | 11/1999 | | |
| JP | 2002-307404 A | 10/2002 | | |
| JP | 3974175 B2 | 9/2007 | | |
| JP | 2018-199198 A | 12/2018 | | |
| JP | 2019-30916 A | 2/2019 | | |
| KR | 2008028055 A * | 3/2008 | ............. | B23C 5/20 |
| KR | 1500152 B1 * | 3/2015 | ............. | B23C 5/22 |
| WO | WO 97/10915 A1 | 3/1997 | | |

OTHER PUBLICATIONS

International Search Report issued Dec. 15, 2020 in PCT/JP2020/035781 filed Sep. 23, 2020, 3 pages.

* cited by examiner

MILLING CUTTER AND BLADE PART THEREOF

TECHNICAL FIELD

The present invention relates to a milling cutter and a blade part thereof.

BACKGROUND ART

A milling cutter has a tip made of cemented carbide, polycrystalline diamond, cubic boron nitride (CBN), or ceramic, and the tip is attached to the outer circumference of a disk or a cylinder. For such a tip, a helix angle and a rake angle suitable for a workpiece are set as necessary, to cut a workpiece such as wood, a wooden board, a ceramic material, metal, or a complex material thereof.

In some conventional milling cutters, a multiple-blade configuration with an increased number of blades is used for adapting to high-speed working (Patent Literature 1). Since such a milling cutter is expensive, a tip thereof may be individually fixed so as to be replaceable when the tip becomes unusable because of chipping or wearing of a cutting edge, for example. A replacement tip is adjusted so as to make the rake angle and the helix angle appropriate for ensuring working accuracy. However, adjustment accompanying replacement of the tip attached to the milling cutter is complex and therefore is required to be as simple as possible.

CITATION LIST

Patent Literature

Patent Literature 1: JP2019-030916 (A)

SUMMARY OF INVENTION

Technical Problem

As described above, a tip of a milling cutter is required to be replaced at low cost and easily, and an object of the present invention is to provide a milling cutter and a milling cutter blade part that solve the above problem.

Solution to Problem

In order to achieve the above object, a milling cutter according to the present invention includes: a blade part having a plurality of tips each provided with an end cutting edge and a peripheral cutting edge, and a blade-body portion which is a plate-shaped body with the plurality of tips fixed to an outer circumference thereof and has a groove in accordance with a position of each tip; and a body being rotatable around a rotational axis and having a front-end portion, the front-end portion having a front-end surface to which a rear-end surface of the blade-body portion is fixable detachably and in close contact therewith, and a front-end outer-circumferential portion whose outer diameter is 100/100 to 97/100 using an outer diameter of the blade-body portion as a reference (100/100), the front-end outer-circumferential portion having a body-side groove continuous to the groove of the blade-body portion contacted closely.

Advantageous Effects of Invention

In the milling cutter of the present invention, the replaceable blade part is provided at the front end of the milling cutter. Thus, the cost is reduced as compared to a case of replacing the whole milling cutter, and replacement is easier as compared to a case of individually replacing the tip. In addition, the outer diameter of the blade-body portion of the replaceable blade part is set to be equal to or slightly greater than the outer diameter of the front-end outer-circumferential portion of the contacting body. This enables the blade part to be held by the front-end portion of the body, so that deformation of the blade part due to milling cutter working is suppressed and milling cutter working is performed with high accuracy.

DESCRIPTION OF EMBODIMENTS

Figure 1:
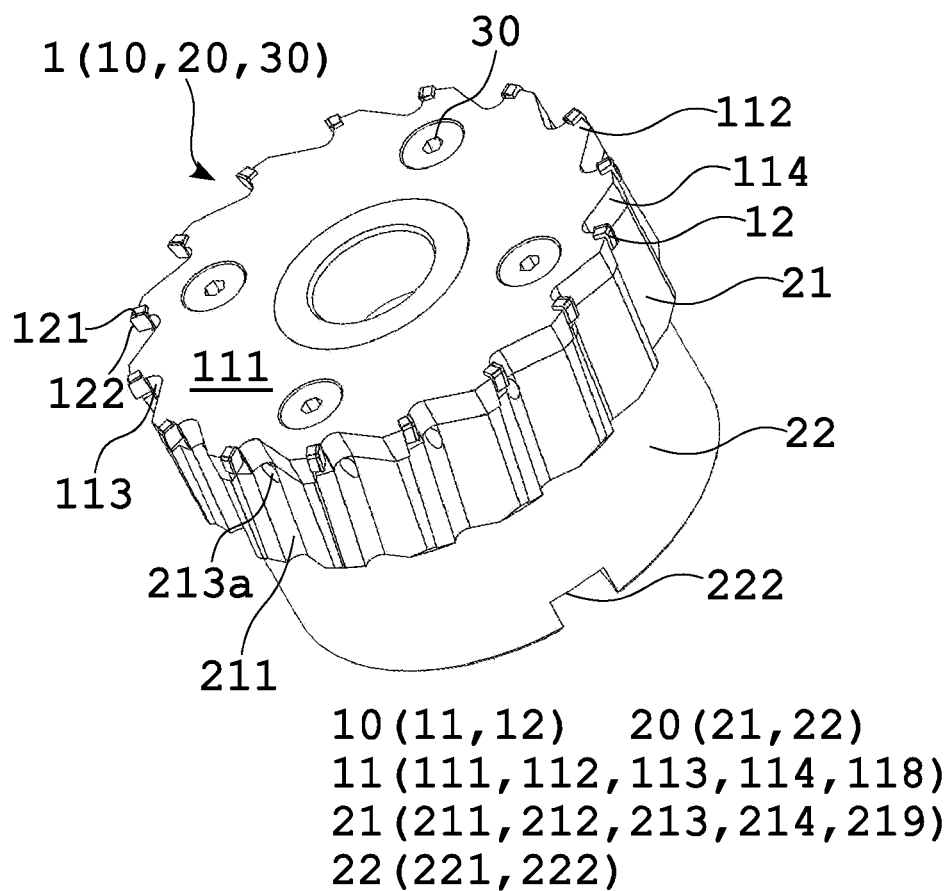
FIG. 1 is a perspective view of a milling cutter in embodiment 1.

Hereinafter, a milling cutter and a blade part thereof according to the present invention will be described in detail on the basis of embodiments with reference to the drawings. A milling cutter of the present embodiment is a milling cutter having a multiple-blade configuration with an increased number of blades, and is particularly suitable for a face milling cutter. In particular, the milling cutter is preferably used for light-metal working. As used herein, aside contacting with a workpiece in the rotational-axis direction of the milling cutter is referred to as front end and a side opposite to the front end is referred to as rear end.

The milling cutter of the present embodiment has a blade part and a body. The blade part and the body are fixed such that a rear-end surface of a blade-body portion composing the blade part closely contacts with and abuts on a front-end surface of the body. A method for fixation therebetween is not particularly limited, but for example, the fixation may be made using a fastening bolt (e.g., flat-head bolt) and a screw hole formed in the front-end surface of the body.

The blade part has a plurality of tips and a blade-body portion to which the tips are fixed. Each tip is provided with an end cutting edge and a peripheral cutting edge. The material of the tip is not particularly limited, but for example, the tip may be made of cemented carbide, polycrystalline diamond, CBN, or ceramic. In particular, materials may be different between a cutting edge and the other part. The number of the tips is not particularly limited, and may be any number not less than 2.

If the tip is worn or damaged, the blade part is detached from the body and replaced with a usable blade part, thus enabling continuation of usage. Replacement of the blade part is easier than replacement and adjustment of the tip. The detached blade part may be polished again or repaired.

The blade-body portion is a plate-shaped body and has a shape close to a disk as a whole. The material of the blade-body portion is not particularly limited, but alloy tool steel is preferable. The thickness of the blade-body portion is preferably not less than 4 mm, more preferably not less than 5 mm, and even more preferably not less than 6 mm.

When the thickness is great, deformation of the blade-body portion is suppressed, whereby accuracy of working using the milling cutter of the present embodiment is improved. Desirably, the rear-end surface which is a surface of the blade-body portion contacting with the body is closely contactable with the front-end surface of the body described later, and particularly desirably, is a flat surface. The close-contact part between the rear-end surface of the blade-body portion and the front-end surface of the body is preferably a vicinity of a part where the tips are fixed. This is because bending of the blade-body portion is suppressed by close-contact of the body front-end surface.

A plurality of tips are fixed to the outer circumference of the blade-body portion. Each tip may be fixed by a method such as brazing, welding, or bonding by an adhesive. The tip has a peripheral cutting edge fixed. The tip may be fixed to form a positive helix angle. Increasing the positive helix angle improves swarf-discharge performance and cutting performance, and reducing the positive helix angle improves durability of the cutting edge formed at the tip. For the positive helix angle, a lower limit value may be about 1°, 3°, or 5° and an upper limit value may be about 10°, 15°, or 20°, with respect to the rotational axis. These values may be freely combined. The end cutting edge and the peripheral cutting edge may be each set at any rake angle. In particular, a positive rake angle is preferable.

Arrangement in which the plurality of tips are fixed to the outer circumference of the blade-body portion is not particularly limited. For example, the tips may be arranged at rotation-symmetric positions about the rotational axis or at unequal positions that are not rotation-symmetric. The blade-body portion has a groove in accordance with a part where each tip is fixed.

When the tips are fixed to the outer circumference of the blade-body portion, the fixation is preferably made such that a sum S of runout of the rear-end surface of the blade-body portion and runout of the end cutting edge is not greater than 15 μm, whereby milling cutter working with high accuracy is achieved. As used herein, the "runout" is the maximum value of a runout width when the blade part is rotated by one revolution around the rotational axis. The sum S is preferably not greater than 10 μm and more preferably not greater than 5 μm.

The body has a front-end portion to which the blade part is fixed. The material of the body is not particularly limited, but alloy tool steel is preferable. The body may be formed by two or more divided parts, which may be respectively made of different materials. The front-end portion has a front-end surface to which at least a part of a rear-end surface of the blade-body portion is fixed detachably and in close contact therewith. Particularly desirably, the close-contact is made in the vicinity of the outer circumference of the blade-body portion. Further, the front-end surface is desirably provided so as to be closely contactable with the entire rear-end surface of the blade part. The front-end surface has a complementary shape with the rear-end surface of the blade-body portion, and if the rear-end surface is a flat surface, the front-end surface is also a flat surface. In the case of a flat surface, preferably, runout around the rotational axis is small, and the upper limit value thereof is preferably about 5 μm, 3 μm, or 0 μm.

Regarding the shape of the outer circumference (front-end outer-circumferential portion) of the front-end portion, the projected shape thereof in the rotational-axis direction is equivalent to the projected shape of the blade-body portion in the rotational-axis direction. Specifically, the outer diameter of the front-end outer-circumferential portion is 100/100 to 97/100, using the outer diameter of the blade-body portion as a reference (100/100). In particular, also the outer diameter of the shape of the front-end surface is preferably 100/100 to 97/100, using the outer diameter of the blade-body portion as a reference. Each of the lower limit values of the outer diameters of the front-end portion and the front-end surface is preferably 98/100. The outer diameter of the blade-body portion is not particularly limited, but may be about 25 mm to 300 mm.

The front-end outer-circumferential portion has a body-side groove continuous to the groove of the blade-body portion closely contacted. Swarf generated in working is discharged through the groove of the blade-body portion and then the body-side groove. The projected shape of the body-side groove in the rotational-axis direction is approximately the same as the projected shape of the groove of the blade-body portion.

The body may have a cutting-fluid supply path of which an outlet for supplying a cutting fluid opens at the body-side groove. The opening diameter of the outlet is not particularly limited, but may be about 0.5 mm to 3 mm. The outlet is formed on a side as close to the blade part as possible in the body-side groove. In particular, the outlet is formed so as to open at a part adjacent to the front-end surface. In order to discharge the cutting fluid from the outlet toward the tip fixed to the blade part, the cutting-fluid supply path is formed in a direction as close to a direction parallel to the rotational axis as possible so that the discharging direction of the cutting fluid is directed toward the front-end side in the rotational-axis direction. If the length in the rotational-axis direction of the milling cutter of the present embodiment is not sufficient, the cutting-fluid supply path may be formed in a bent shape. Preferably, the outlets are opened at all the body-side grooves continuous to the grooves corresponding to the parts where the tips are fixed.

If the tip fixed to the blade-body portion has a positive helix angle, a second peripheral cutting edge may be provided at the outer circumference on the rear-end side relative to the tip. The second peripheral cutting edge has a negative helix angle. When cutting is performed by the peripheral cutting edge having a positive helix angle, swarf is biased toward the rear-end side and thus so-called burr may be generated. The burr is removed by being biased toward the front-end side by the second peripheral cutting edge having a negative helix angle. The second peripheral cutting edge is provided to the second tip. The second tip may be fixed on the rear-end side of the blade-body portion or on the front-end side of the body. The second tip may be fixed to a second blade-body portion which is a different member from the blade-body portion and the body, to form a second blade part.

Preferably, the projected shape of the second blade-body portion in the rotational-axis direction is the same as that of the blade-body portion, and preferably, also the thicknesses of both portions are approximately equal to each other. In many cases, even if the number of the second tips is smaller than the number of tips of the blade part, the second tips sufficiently work.

Embodiment 1

As shown in FIGS. 1 to 5, a milling cutter 1 of the present embodiment has a blade part 10 and a body 20. The blade part 10 has a blade-body portion 11 and sixteen tips 12. The blade part 10 is fastened to the body 20 by flat-head bolts 30. Attachment and detachment are easily performed using the flat-head bolts 30, and subsequent adjustment is not needed.

Therefore, even if the tip 12 is worn or chipped, working is readily restarted by replacing the blade part 10 as a whole. Since only the blade part 10 is replaced, the cost is reduced as compared to a case of preparing a spare milling cutter and replacing the whole milling cutter.

Figure 2:
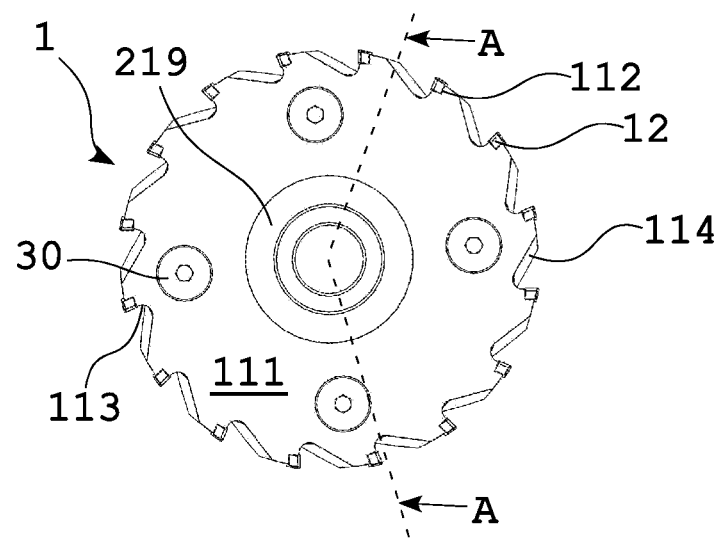
FIG. 2 is a plan view of the milling cutter in embodiment 1.
Figure 3:
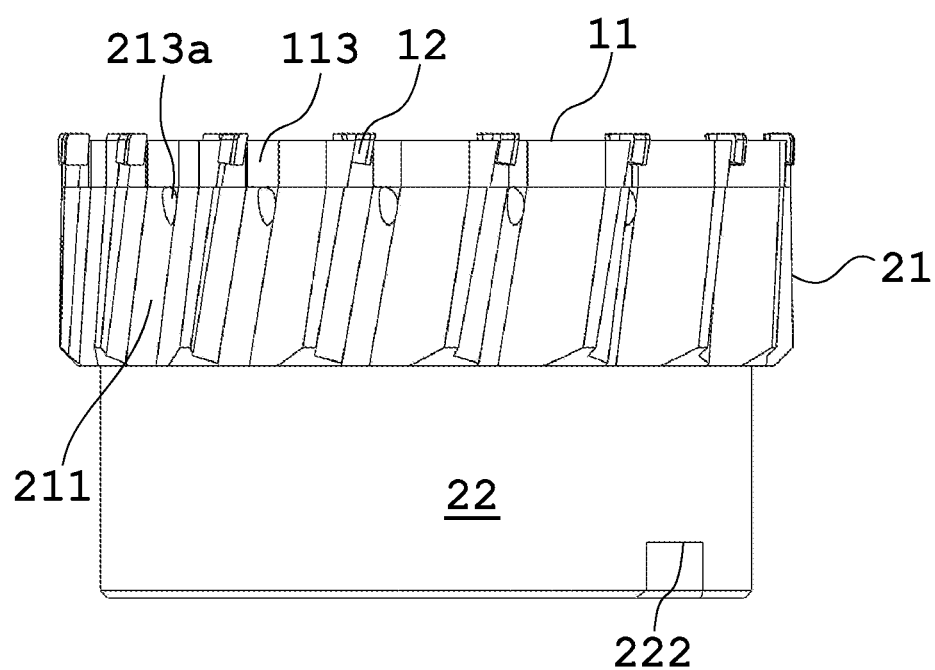
FIG. 3 is a front view of the milling cutter in embodiment 1.
Figure 4:
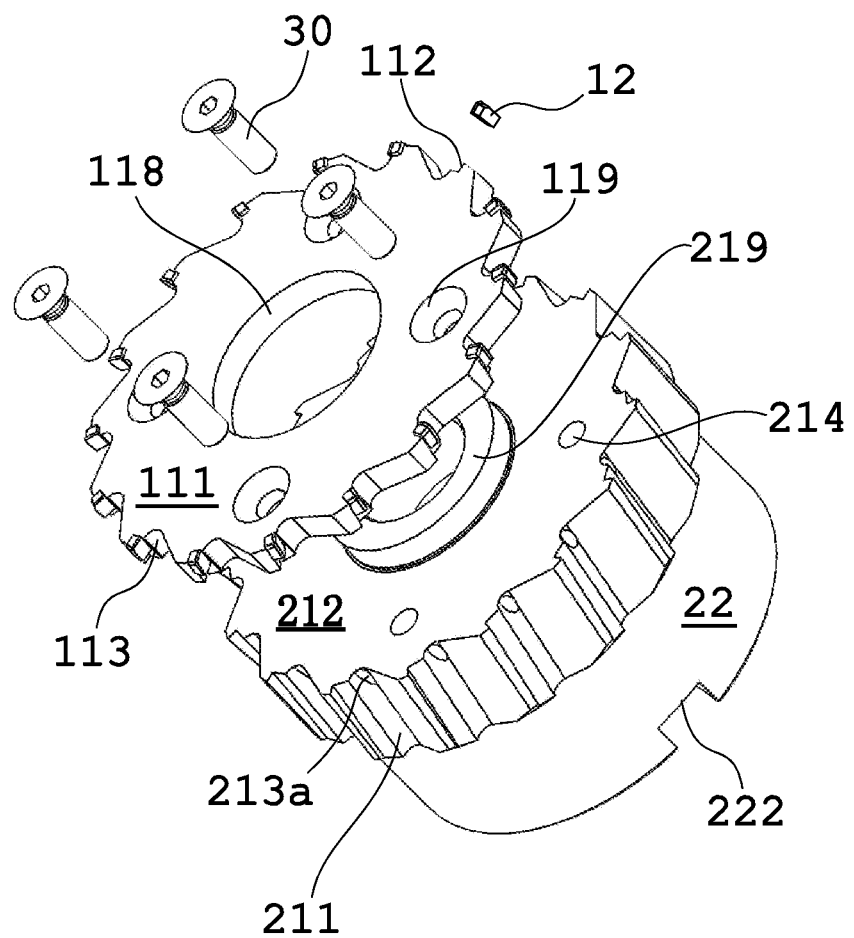
FIG. 4 is an exploded assembly view of the milling cutter in embodiment 1.
Figure 5:
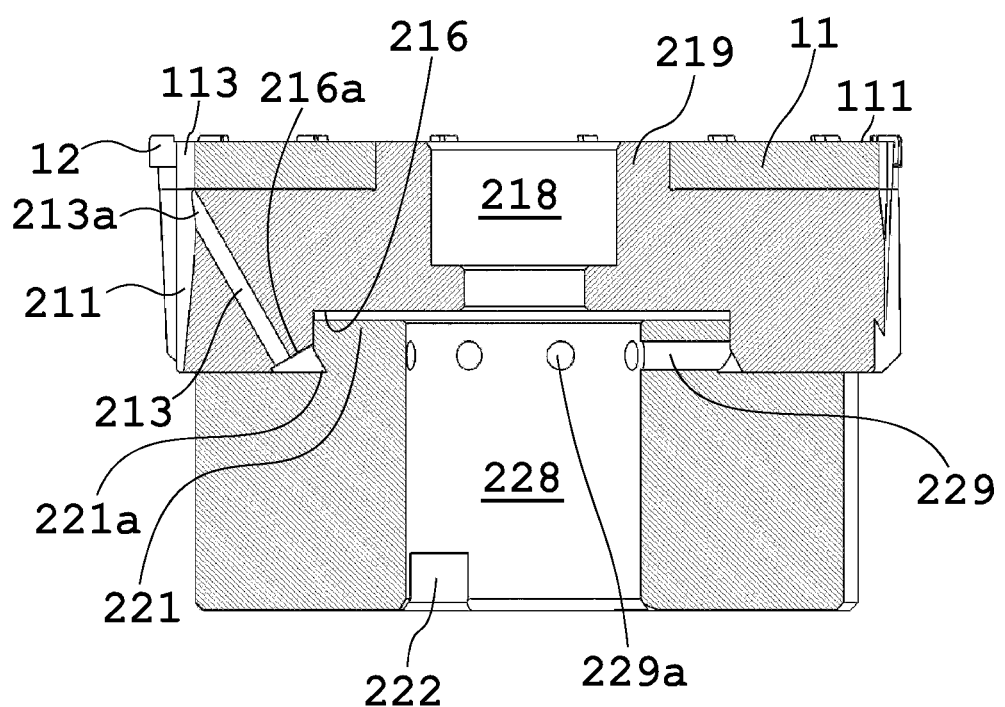
FIG. 5 is a sectional view along line A-A in FIG. 2.

The milling cutter 1 of the present embodiment has a rotational axis extending in the sheet front-back direction through the center in FIG. 2. The sheet front side in FIG. 2 and the upper side in FIG. 3 correspond to the front-end side, and the sheet back side in FIG. 2 and the lower side in FIG. 3 correspond to the rear-end side.

The blade-body portion 11 is made of alloy tool steel. The blade-body portion 11 has substantially a disk shape with a thickness of 5 mm and a diameter of 79 mm. The blade-body portion 11 has an attachment hole 118 at the center, and has, around the attachment hole 118, four screw holes 119 through which the flat-head bolts 30 penetrate.

The sixteen tips 12 are fixed to the outer circumference of the blade-body portion 11. The outer circumference of the blade-body portion 11 is divided into sixteen sections at 22.5° intervals, and tip seats 112 are provided at the sixteen sections. The sixteen tips 12 are respectively fixed to the sixteen tip seats 112. The blade-body portion 11 has grooves 113 and reliefs 114 correspondingly to the sixteen divided positions where the respective tip seats 112 are provided.

The tip 12 is provided with an end cutting edge 121 and a peripheral cutting edge 122. The end cutting edge 121 and the peripheral cutting edge 122 are provided with chamfered edges at corners. The tip 12 is fixed to the tip seat 112 such that the end cutting edge 121 protrudes on a front-end surface 111 side of the blade-body portion 11 and the peripheral cutting edge 122 protrudes radially outward of the blade-body portion 11. The fixation to the tip seat 112 is made by brazing. In the fixation of the tip 12, the peripheral cutting edge 122 has a positive helix angle. The end cutting edge 121 has a rake angle.

Of the blade-body portion 11, the front-end surface 111 and a rear-end surface (not shown) opposite to the front-end surface 111 are flat surfaces forming the same projected shape in the rotational-axis direction. The front-end surface 111 and the rear-end surface are closely contactable over the entire surface, and thus deformation of the blade-body portion 11 is suppressed. Therefore, since accuracy of the rear-end surface influences working accuracy, manufacturing is performed so as to reduce runout. Specifically, a sum S of runout of the end cutting edge 121 provided to the tip 12 and runout of the rear-end surface is set to be not greater than 4 μm. In addition, since the thickness of the blade-body portion 11 is great, bending due to an external force or thermal variation hardly occurs, and thus working accuracy is enhanced.

The body 20 has a front-end portion 21 and a base-end portion 22 fitted and fixed to the rear-end side of the front-end portion 21. The front-end portion 21 is made of alloy tool steel or an aluminum alloy, and the base-end portion 22 is made of an aluminum alloy. The outer shape of the base-end portion 22 is substantially a cylindrical shape, and the base-end portion 22 has a fitting groove 222 connectable to a working machine, on the rear-end side.

The outer shape of the front-end portion 21, when projected in the rotational-axis direction, is the same as the outer shape of the blade-body portion 11. A front-end surface 212 of the front-end portion 21 is a flat surface and closely contacts with the rear-end surface of the blade-body portion 11. Thus, the rear-end surface of the blade-body portion 11 is supported as a whole by the front-end surface 212 of the front-end portion 21, whereby bending of the blade-body portion 11 is prevented from occurring during cutting work. From the standpoint of preventing occurrence of bending during cutting work, in particular, the front-end surface 212 preferably has a projected shape in the rotational-axis direction such that the front-end surface 212 is present in the vicinity of the tip seats 112 to which the tips 12 are fixed.

Screw holes 214 to which the flat-head bolts 30 are fastened are formed at the front-end surface 212. Body-side grooves 211 are formed on a front-end outer-circumferential portion which is the outer circumference of the front-end portion 21, and each body-side groove 211 extends from the groove 113 formed on the blade-body portion 11 and has the same sectional shape as the groove 113.

On the front-end side of the base-end portion 22, A protrusion 221 is formed, and at the center thereof, a bore 228 penetrating in the rotational-axis direction is formed. On the rear-end side of the front-end portion 21, a recess 216 is formed, and at the center thereof, a central hole 218 penetrating in the rotational-axis direction is formed.

An attachment seat 219 to which the attachment hole 118 of the blade-body portion 11 is fitted is formed around the central hole 218 on the front-end side of the front-end portion 21. The attachment seat 219 is flush with the front-end surface of the blade-body portion 11, when fitted to the attachment hole 118.

By the protrusion 221 being fitted to the recess 216, the front-end portion 21 and the base-end portion 22 are fixed to each other. In the present embodiment, the front-end portion 21 and the base-end portion 22 are fastened by a bolt (not shown) from the rear-end side of the base-end portion 22, so as to be detachably fixed to each other. A circumferential groove 221a in a circumferential shape is formed on the rear-end side of the protrusion 221, and a chamfer 216a in a circumferential shape is formed on the rear-end side of the recess 216. When the recess 216 and the protrusion 221 are fitted to each other, a circumference-shaped groove (221a, 216a) is formed by the circumferential groove 221a and the chamfer 216a.

In the protrusion 221, eight first cutting-fluid supply paths 229 are formed so as to extend radially toward the circumferential groove 221a on the outer-circumferential surface of the protrusion 221 and have supply ports 229a that open on the inner surface of the bore 228. In the front-end portion 21, a second cutting-fluid supply path 213 is formed so as to extend from the chamfer 216a of the inner surface of the recess 216 on the rear-end side and communicate with an outlet 213a that opens to the front-end side of the body-side groove 211. That is, from the bore 228 of the base-end portion 22, the supply port 229a, the first cutting-fluid supply path 229, the circumference-shaped groove (221a, 216a), the second cutting-fluid supply path 213, and the outlet 213a that opens at the body-side groove 211, communicate with each other, and thus a cutting fluid supplied from the bore 228 is discharged from the outlet 213a. Since the direction of the second cutting-fluid supply path 213 is set to be close to a direction parallel to the rotational axis, the cutting fluid discharged from the outlet 213a is discharged toward the front-end side from the outlet 213a. As a result, a large amount of the cutting fluid reaches each tip 12. Therefore, desirably, the direction of the second cutting-fluid supply path 213 is as close to a direction parallel to the rotational axis as possible.

Embodiment 2

A milling cutter according to the present embodiment will be described with reference to the drawings. The milling cutter of the present embodiment is composed of almost the same components as those of the milling cutter of embodiment 1, and equivalent components are denoted by the same reference characters. Regarding the blade part 10, the thickness of the blade-body portion 11 is halved as compared to the milling cutter of embodiment 1, but the basic function thereof is the same and therefore the same reference character is given.

Figure 6:
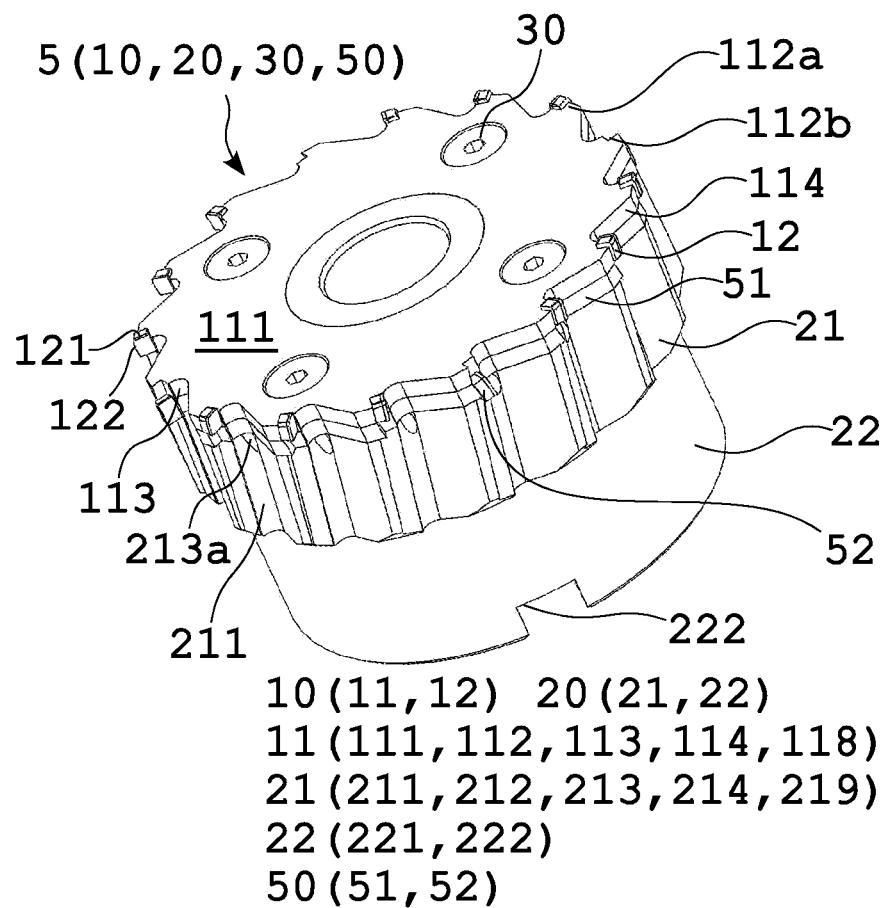
FIG. 6 is a perspective view of a milling cutter in embodiment 2.

As shown in FIG. 6, a milling cutter 5 of the present embodiment has a second blade part 50 between the blade part 10 and the body 20 in the milling cutter of embodiment 1.

Twelve tips 12 are fixed to the outer circumference of the blade-body portion 11. The outer circumference of the blade-body portion 11 is divided into sixteen parts at 22.5° intervals, and the tip seats 112 are provided at the sixteen parts. The sixteen tip seats 112 (112a and 112b) include a set in which three tip seats 112a to which the tips 12 are fixed and the tip seat 112b to which the tip 12 is not fixed are arranged in this order, and four such sets are combined to form the sixteen tip seats 112.

The second blade part 50 has second tips 52 fixed at parts where the tips 12 are not fixed among the tip seats 112 of the blade-body portion 11 of the blade part 10. Specifically, four second tips 52 are fixed. Each second tip 52 is provided with a peripheral cutting edge and is fixed to the tip seat 112 so as to have a negative helix angle.

By providing the second tips 52 having a negative helix angle, occurrence of burr on the workpiece surface by the tips 12 is effectively suppressed. Further, even if the cutting edge provided to the second tip 52 is worn, the second blade part 50 is easily replaced. In addition, this replacement is performed separately from replacement of the blade part 10.

DESCRIPTION OF THE REFERENCE CHARACTERS

- 1, 5 milling cutter
- 10 blade part
- 11 blade-body portion
- 12 tip
- 111 front-end surface
- 112(a, b) tip seat
- 113 groove
- 114 relief
- 118 attachment hole
- 119 screw hole
- 121 end cutting edge
- 122 peripheral cutting edge
- 20 body
- 21 front-end portion
- 22 base-end portion
- 211 body-side groove
- 212 front-end surface
- 213 second cutting-fluid supply path
- 213a outlet
- 214 screw hole
- 216 recess
- 216a chamfer
- 218 central hole
- 219 attachment seat
- 221 protrusion
- 221a circumferential groove
- 228 bore
- 229 first cutting-fluid supply path
- 229a supply port
- 222 fitting groove
- 30 flat-head bolt
- 50 second blade part
- 52 second tip

The invention claimed is:

1. A milling cutter comprising:
a blade part having a plurality of tips each provided with an end cutting edge and a peripheral cutting edge, and a blade-body portion which is a plate-shaped body with the plurality of tips fixed to an outer circumference thereof and has a groove in accordance with a position of each tip;
a body being rotatable around a rotational axis and transmitting a rotational driving force to the blade-body portion from outside, the body having a front-end portion, the front-end portion having a front-end surface to which a rear-end surface of the blade-body portion is fixable detachably and in close contact therewith, and a front-end outer-circumferential portion whose outer diameter is 100/100 to 97/100 using an outer diameter of the blade-body portion as a reference (100/100), the front-end outer-circumferential portion having a body-side groove continuous to the groove of the blade-body portion contacted closely; and
a fastening bolt to be fastened to the body, penetrating through the blade-body portion from a front-end surface side,
wherein the rear-end surface of the blade-body portion is formed to be a flat plane surface, and the blade-body portion is provided with an attachment hole provided at the front-end surface side of the body and having a cylindrical outer peripheral surface around which an attachment seat is fitted to, and a fastening bolt hole provided around the attachment hole for penetrating the fastening bolt therethrough from the front-end surface towards the body for fixing thereto.

2. The milling cutter according to claim 1, wherein a cutting-fluid supply path having an outlet at a part adjacent to the front-end surface is formed for the body-side groove.

3. The milling cutter according to claim 1, wherein the tip has a positive helix angle, and
the blade part or the body has a second blade part fixed on a rear-end side relative to the tip, with a second tip fixed to the second blade part, the second tip being provided with a peripheral cutting edge having a negative helix angle.

4. The milling cutter according to claim 1, wherein the rear-end surface and the front-end surface have a same shape in the rotational-axis direction.

5. A milling cutter blade part which is the blade part used for the milling cutter according to claim 1, wherein
a thickness of the blade-body portion is not less than 4 mm, and
a sum of runout of the rear-end surface of the blade-body portion and runout of the end cutting edge is not greater than 15 μm.

6. The milling cutter according to claim 2, wherein the tip has a positive helix angle, and
the blade part or the body has a second blade part fixed on a rear-end side relative to the tip, with a second tip fixed to the second blade part, the second tip being provided with a peripheral cutting edge having a negative helix angle.

7. The milling cutter according to claim 2, wherein
the rear-end surface and the front-end surface have a same shape in the rotational-axis direction.

8. The milling cutter according to claim 3, wherein
the rear-end surface and the front-end surface have the same projected shape in the rotational-axis direction.

9. The milling cutter according to claim 6, wherein
the rear-end surface and the front-end surface have the same projected shape in the rotational-axis direction.

10. A milling cutter blade part which is the blade part used for the milling cutter according to claim 2, wherein
a thickness of the blade-body portion is not less than 4 mm, and
a sum of runout of the rear-end surface of the blade-body portion and runout of the end cutting edge is not greater than 15 μm.

11. A milling cutter blade part which is the blade part used for the milling cutter according to claim 3, wherein
a thickness of the blade-body portion is not less than 4 mm, and
a sum of runout of the rear-end surface of the blade-body portion and runout of the end cutting edge is not greater than 15 μm.

12. A milling cutter blade part which is the blade part used for the milling cutter according to claim 6, wherein
a thickness of the blade-body portion is not less than 4 mm, and
a sum of runout of the rear-end surface of the blade-body portion and runout of the end cutting edge is not greater than 15 μm.

13. A milling cutter blade part which is the blade part used for the milling cutter according to claim 4, wherein
a thickness of the blade-body portion is not less than 4 mm, and
a sum of runout of the rear-end surface of the blade-body portion and runout of the end cutting edge is not greater than 15 μm.

14. A milling cutter blade part which is the blade part used for the milling cutter according to claim 7, wherein
a thickness of the blade-body portion is not less than 4 mm, and
a sum of runout of the rear-end surface of the blade-body portion and runout of the end cutting edge is not greater than 15 μm.

15. A milling cutter blade part which is the blade part used for the milling cutter according to claim 8, wherein
a thickness of the blade-body portion is not less than 4 mm, and
a sum of runout of the rear-end surface of the blade-body portion and runout of the end cutting edge is not greater than 15 μm.

16. A milling cutter blade part which is the blade part used for the milling cutter according to claim 9, wherein
a thickness of the blade-body portion is not less than 4 mm, and
a sum of runout of the rear-end surface of the blade-body portion and runout of the end cutting edge is not greater than 15 μm.

\* \* \* \* \*